(12) United States Patent
Cook et al.

(10) Patent No.: US 12,063,078 B2
(45) Date of Patent: Aug. 13, 2024

(54) DOCSIS RADIO FREQUENCY (RF) LEAKAGE MANAGEMENT

(71) Applicant: Charter Communications Operating, LLC, St. Louis, MO (US)

(72) Inventors: Charles Cook, Castle Rock, CO (US); Roger Stafford, Thornton, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 158 days.

(21) Appl. No.: 17/676,135

(22) Filed: Feb. 19, 2022

(65) Prior Publication Data
US 2023/0268956 A1   Aug. 24, 2023

(51) Int. Cl.
| H04B 3/48 | (2015.01) |
| H04L 12/28 | (2006.01) |
| H04L 41/0806 | (2022.01) |
| H04L 41/0896 | (2022.01) |

(52) U.S. Cl.
CPC ........... *H04B 3/48* (2013.01); *H04L 12/2801* (2013.01); *H04L 41/0806* (2013.01); *H04L 41/0896* (2013.01)

(58) Field of Classification Search
CPC ... H04B 3/48; H04L 12/2801; H04L 41/0806; H04L 41/0896; H04L 12/2856; H04L 5/14; H04L 5/0007; H04L 5/023; H04L 1/24; H04L 12/2898; H04L 27/2647; H04L 5/06; H04L 27/2601; H04L 27/2657; H04L 5/006; H04L 12/28; H04L 2012/2843
See application file for complete search history.

(56) References Cited

U.S. PATENT DOCUMENTS

| 6,240,274 B1 * | 5/2001 | Izadpanah | ........... H04L 27/2601 455/39 |
| 6,385,773 B1 * | 5/2002 | Schwartzman | ..... H04L 12/2801 725/124 |

(Continued)

FOREIGN PATENT DOCUMENTS

| CA | 2103714 C | * | 7/2001 | ......... H04L 27/2071 |
| CA | 2933674 C | * | 4/2019 | .......... H04J 11/0023 |

(Continued)

OTHER PUBLICATIONS

Chrostowski et al., "Leakage in a High Split World Detecting and Measuring Upstream Leakage Levels in a One Gpbs Symmetrical High Split Hybrid Fiber Coax Network," Cable-Tex Expo, Oct. 12, 2020, pp. 1-38.

*Primary Examiner* — Akelaw Teshale
(74) *Attorney, Agent, or Firm* — Otterstedt & Kammer PLLC

(57) ABSTRACT

A method, performed by a node, of provisioning a plurality of cable modems connected to the node, the method including: recording a respective transmit power level for each cable modem of the plurality of cable modems; determining a first set of the plurality of cable modems that can be allocated to a specified frequency band available for upstream communications according to an aggregation of the transmit power levels of the first set of the plurality of cable modems; and provisioning each cable modem of the first set to use at least a portion of the specified frequency.

21 Claims, 15 Drawing Sheets

(56) References Cited

U.S. PATENT DOCUMENTS

| | | | | |
|---|---|---|---|---|
| 7,167,511 | B1* | 1/2007 | Goren | H04L 25/14 379/406.01 |
| 7,246,368 | B1* | 7/2007 | Millet | H04L 43/50 725/111 |
| 7,792,963 | B2 | 9/2010 | Gould | |
| 7,979,884 | B1* | 7/2011 | Schwartzman | H04N 7/22 725/38 |
| 7,987,228 | B2* | 7/2011 | McKeown | H04L 41/0631 709/224 |
| 8,015,271 | B2* | 9/2011 | McKeown | H04L 41/0886 709/226 |
| 8,949,919 | B2* | 2/2015 | Cholas | H04N 21/6168 725/112 |
| 9,077,760 | B2* | 7/2015 | McKeown | H04L 9/40 |
| 11,398,967 | B1 | 7/2022 | Stafford | |
| 2003/0056217 | A1 | 3/2003 | Brooks | |
| 2005/0025145 | A1* | 2/2005 | Rakib | H04L 12/407 370/389 |
| 2005/0163152 | A1* | 7/2005 | Binder | H04M 19/02 370/463 |
| 2006/0130107 | A1 | 6/2006 | Gonder et al. | |
| 2006/0221995 | A1* | 10/2006 | Berkman | H04L 12/5692 370/463 |
| 2007/0019669 | A1* | 1/2007 | Binder | H04L 12/2898 370/463 |
| 2007/0217436 | A1 | 9/2007 | Markley | |
| 2009/0248794 | A1 | 10/2009 | Helms | |
| 2010/0313236 | A1 | 12/2010 | Straub | |
| 2011/0043640 | A1 | 2/2011 | Zinevich | |
| 2012/0269242 | A1* | 10/2012 | Prodan | H04L 12/2801 375/222 |
| 2013/0107921 | A1* | 5/2013 | Prodan | H04B 1/04 375/222 |
| 2014/0133352 | A1* | 5/2014 | Chapman | H04L 1/0041 370/254 |
| 2016/0218851 | A1* | 7/2016 | Prodan | H04L 12/2801 |
| 2017/0366983 | A1 | 12/2017 | Gunasekara | |
| 2018/0294837 | A1 | 10/2018 | Chapman | |
| 2020/0266966 | A1* | 8/2020 | Barr | H04L 65/1101 |
| 2021/0227205 | A1* | 7/2021 | Bschor | H04N 17/04 |
| 2022/0045906 | A1* | 2/2022 | Petersen | H04L 41/0816 |
| 2023/0024637 | A1* | 1/2023 | Sevindik | H04N 21/6118 |

FOREIGN PATENT DOCUMENTS

| | | | | |
|---|---|---|---|---|
| EP | 2369673 | A1 * | 9/2011 | H01Q 19/13 |
| EP | 3190714 | A1 * | 7/2017 | H04B 3/06 |

\* cited by examiner

DOCSIS RADIO FREQUENCY (RF) LEAKAGE MANAGEMENT

FIELD OF THE INVENTION

The present invention relates generally to the electrical, electronic and computer arts, and, more particularly, to distributing capacity across a spectrum within a cable network according to signal strength requirements.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 858 Coal Creek Circle, Louisville CO 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

The radio spectrum is the Radio Frequency (RF) portion of the electromagnetic spectrum. RF leakage is an on-going issue for cable and telecoms companies operating hybrid-fiber-coaxial cable plants because some radio bands are regulated by the Federal Communications Commission (FCC), National Telecommunications and Information Administration (NTIA) and Federal Aviation Administration (FAA). These regulated radio bands are typically legally protected from interference that would otherwise affect RF services.

The coaxial portion of an HFC network is by its nature a continuously radiating part of the network where any signals transmitted in either the upstream or downstream spectral band will leak from the network and into the environment to some degree. These leaks can be controlled and minimized with shielding and connectors that offer around 95 dB of attenuation, such that the resulting leakage is small. However, cable shields and connectors can become damaged due to stressors like wind, weather, and corrosion. When damage occurs, radiation levels increase rapidly.

It can be difficult to detect fixed carriers, at least because a detector needs to be able to resolve the carrier above a background noise floor. This is possible only if the tone's amplitude is higher than the noise floor, such as occurs when the detector is close to the tone's point of egress from a break in the cable plant infrastructure.

SUMMARY OF THE INVENTION

Principles of the invention provide techniques for distributing capacity across a spectrum within a cable network according to signal strength requirements.

In one aspect, an exemplary method, performed by a node, of provisioning a plurality of cable modems connected to the node, includes: recording a respective transmit power level for each cable modem of the plurality of cable modems; determining a first set of the plurality of cable modems that can be allocated to a specified frequency band available for upstream communications according to an aggregation of the transmit power levels of the first set of the plurality of cable modems; and provisioning each cable modem of the first set to use at least a portion of the specified frequency.

In one aspect, an exemplary method, performed by a node, of provisioning a plurality of cable modems connected to the node, includes: receiving a request from a first cable modem of the plurality of cable modems for provisioning; determining that capacity is available outside of a specified frequency band; directing the first cable modem to transmit in a band outside of the specified frequency band; receiving a request from a second cable modem of the plurality of cable modems for provisioning; determining that capacity is not available outside of a specified frequency band; determining that a transmit power level of the second cable modem is below a threshold for the specified frequency band; and directing the second cable modem to transmit in at least a portion of the specified frequency band.

According to some embodiments, a system includes: a node comprising a processor and a memory; a plurality of terminus devices; and a network connecting the node and the plurality of terminus devices, wherein the network comprises a coaxial cable portion configured to carry signals in a radio spectrum, wherein the node is configured to allocate a portion of the radio spectrum to each terminus device of the plurality of terminus devices, to set a signal transmit power for each terminus device of the plurality of terminus devices, and to limit an aggregate signal transmit power of a set of the terminus devices allocated to transmit signals in a specified frequency band of the radio spectrum.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., see FIG. 7 and FIG. 10) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:
  distributing capacity across a spectrum within a cable network according to signal strength requirements;
  reducing or eliminating RF leakage from a cable network in one or more select frequency bands; and
  reducing an aggregate transmit power level of a plurality of cable modems in a cable plant.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

DETAILED DESCRIPTION OF PREFERRED EMBODIMENTS

Embodiments of the present invention are related to apparatus, systems, and methods for distributing capacity across a spectrum within a cable network according to signal strength requirements. Embodiments of the present invention are related to apparatus, systems, and methods for reducing or eliminating RF leakage from a cable network in a select frequency band. According to at least one aspect, an aggregate transmit power level of a plurality of cable modems in a cable plant is reduced.

Figure 1:
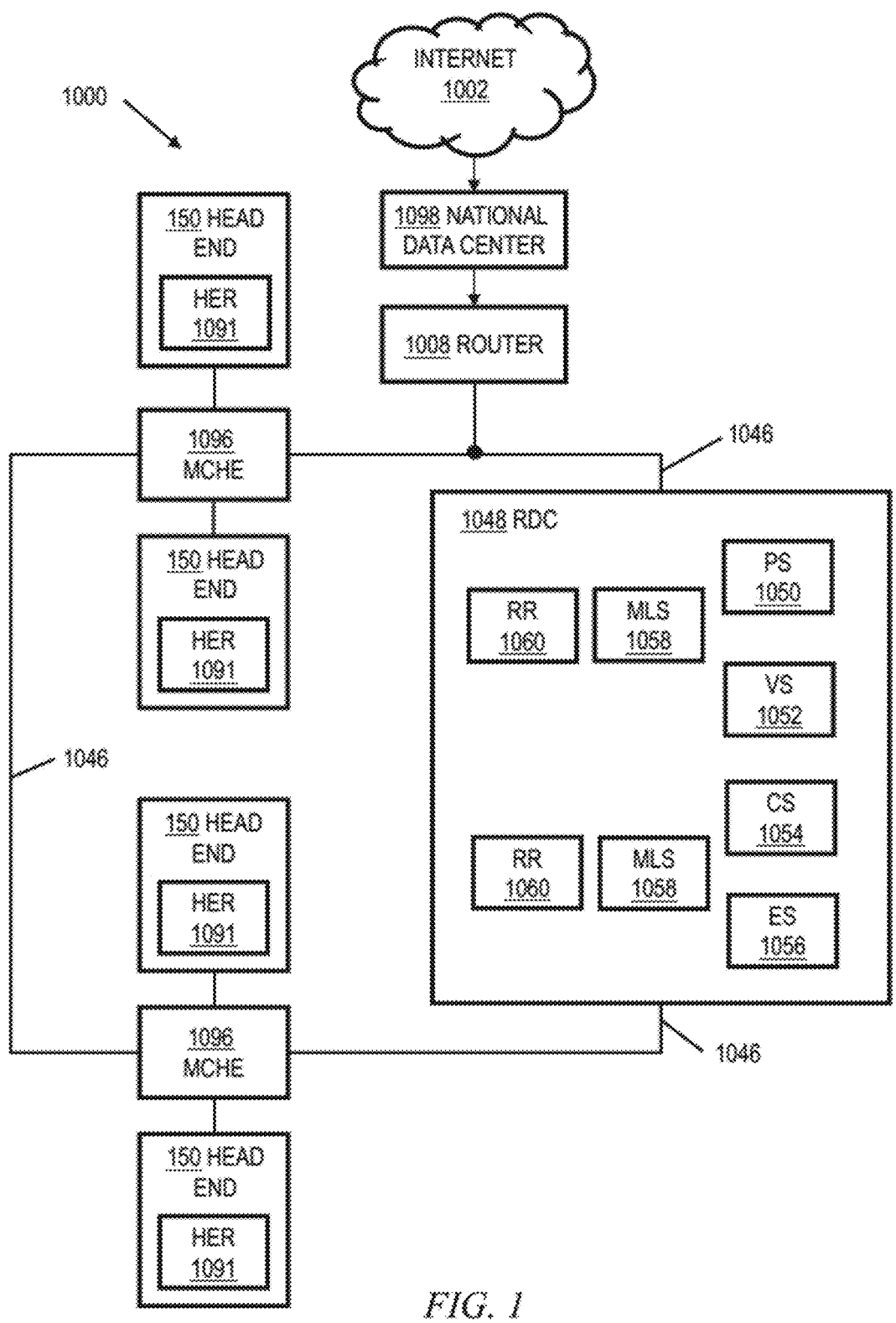
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, CA, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
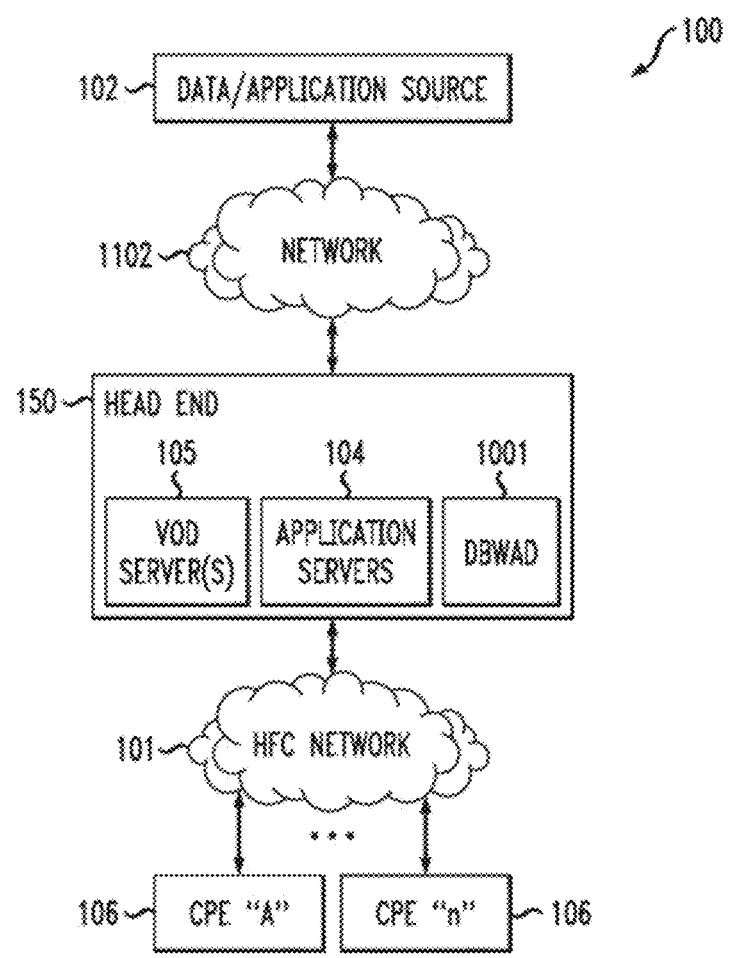
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUS (S-ONUS; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third-party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g., FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
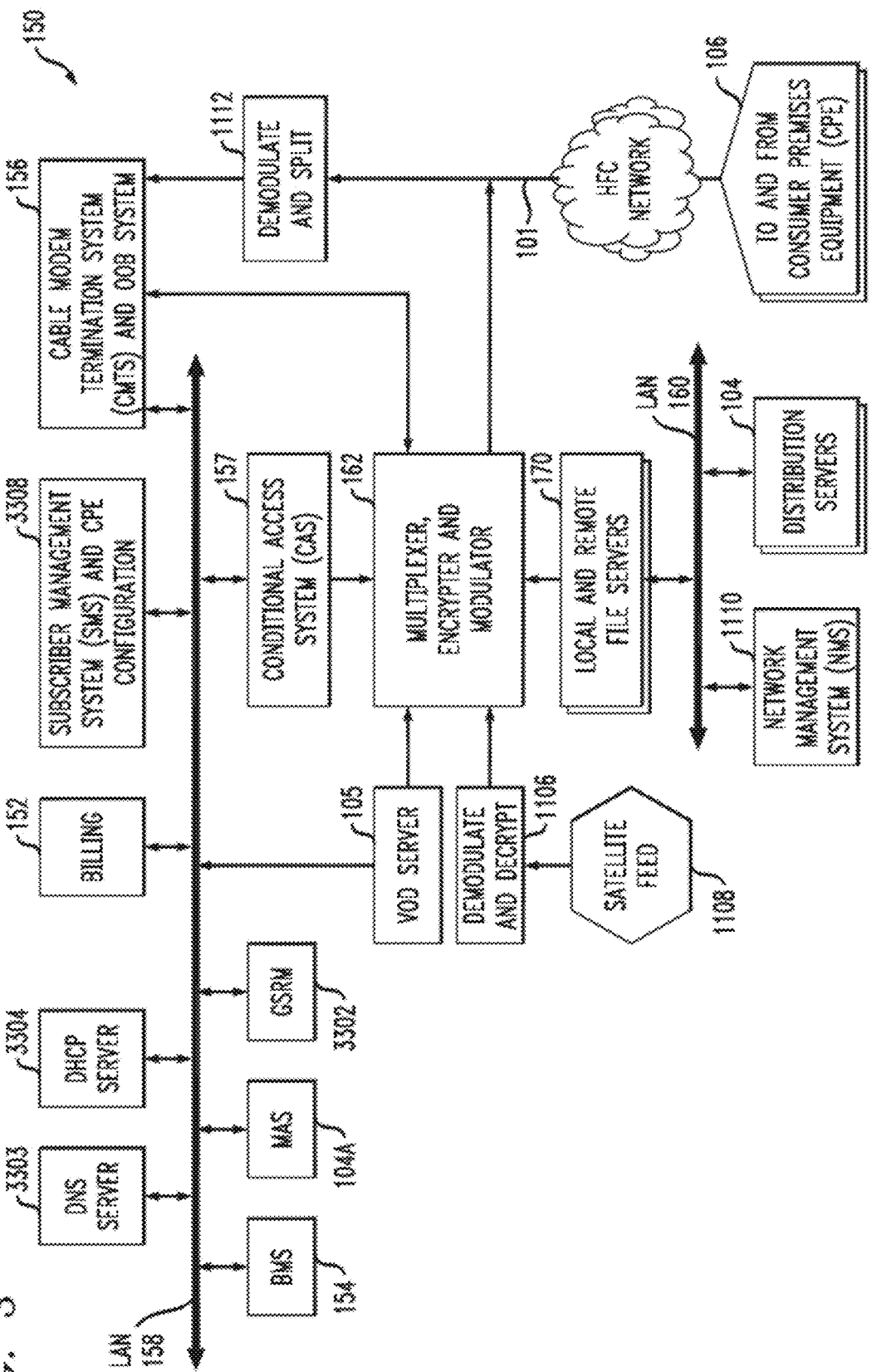
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 858 Coal Creek Circle, Louisville CO 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

It should be noted that the exemplary architecture in FIG. 3 shows a traditional location for the CMTS 156 in a head end. As will be appreciated by the skilled artisan, CMTS functionality can be moved down closer to the customers or up to a national or regional data center or can be dispersed into one or more locations.

Figure 4:
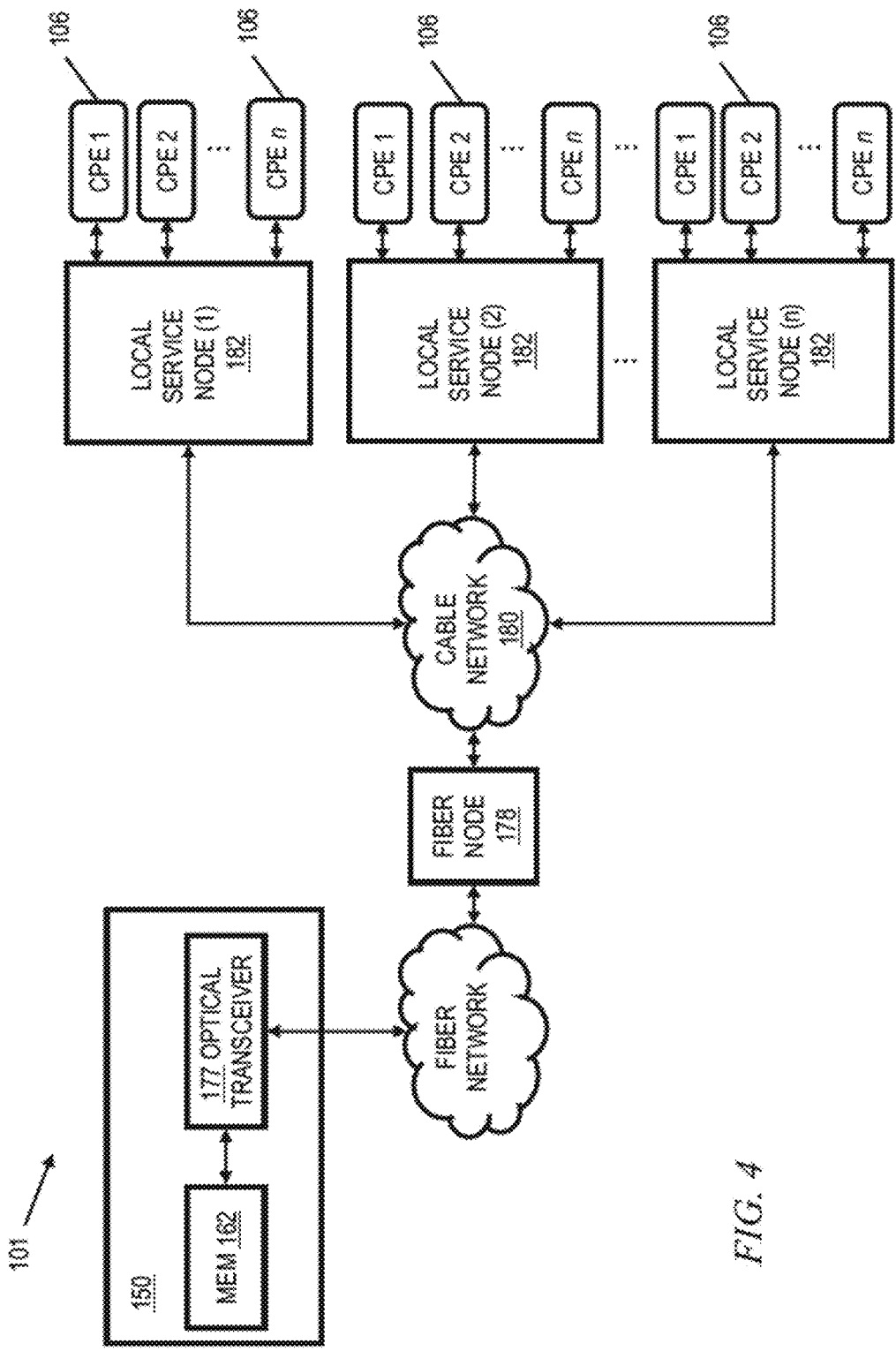
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
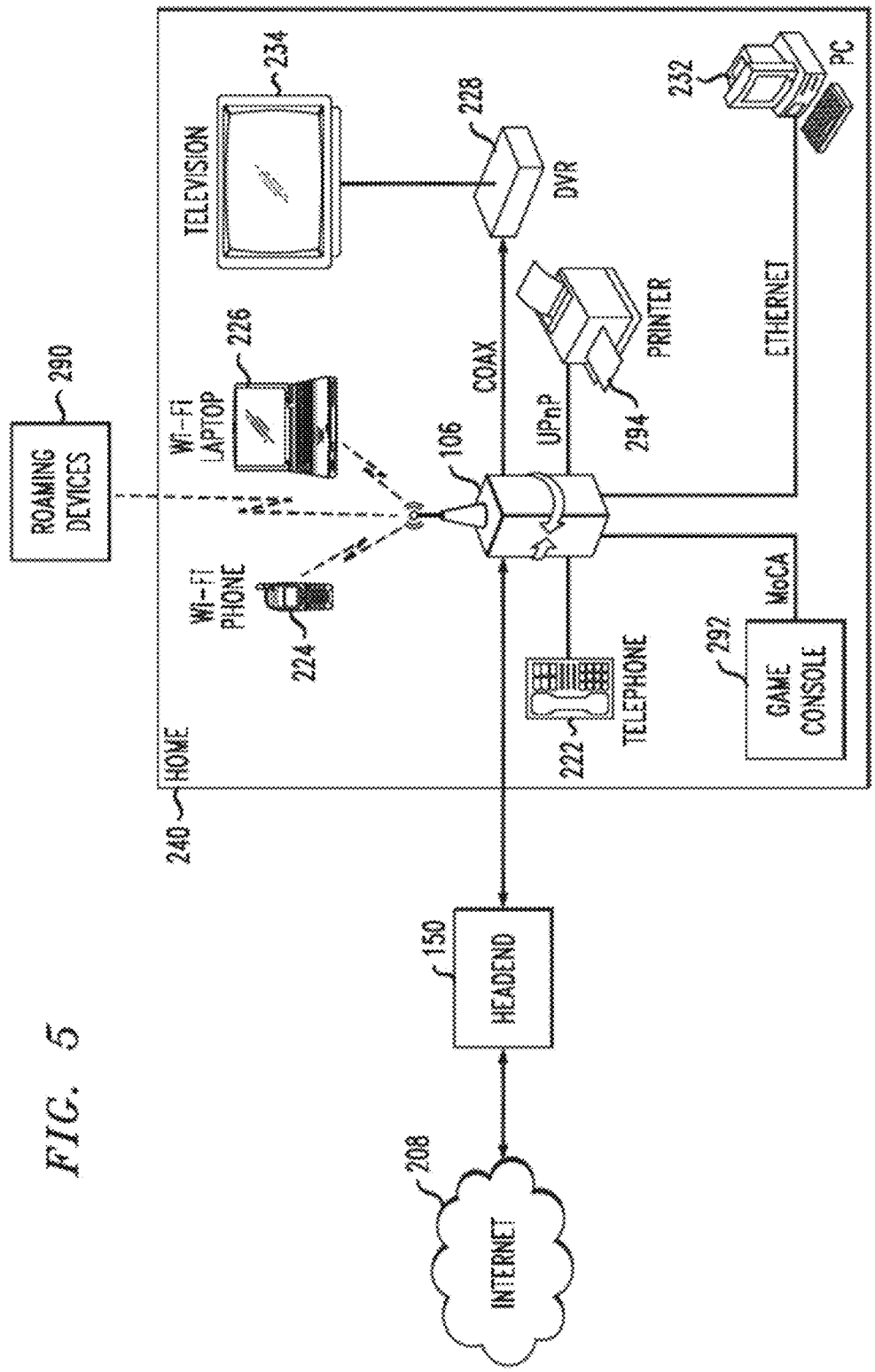
FIG. 5 is a functional block diagram of a premises network, including an exemplary centralized customer premises equipment (CPE) unit, interfacing with a head end such as that of FIG. 3.
Figure 6:
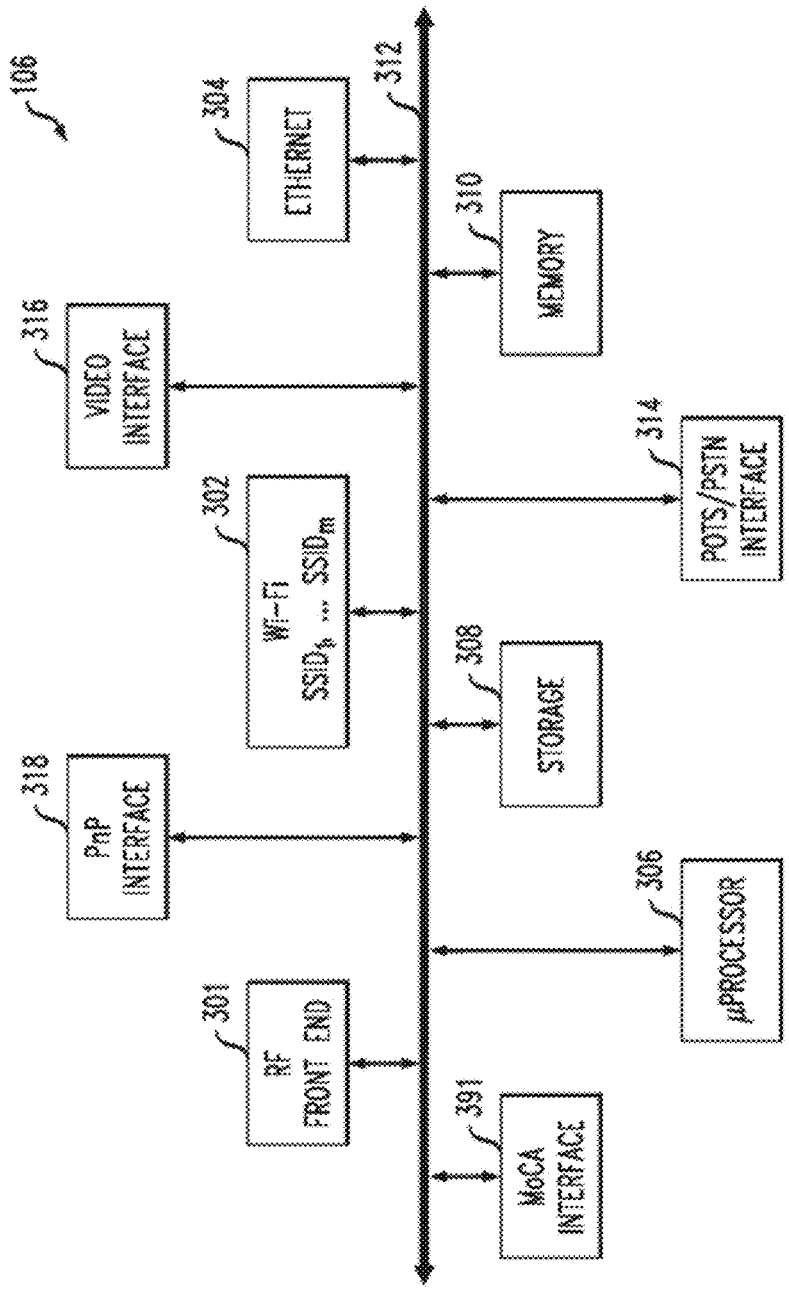
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
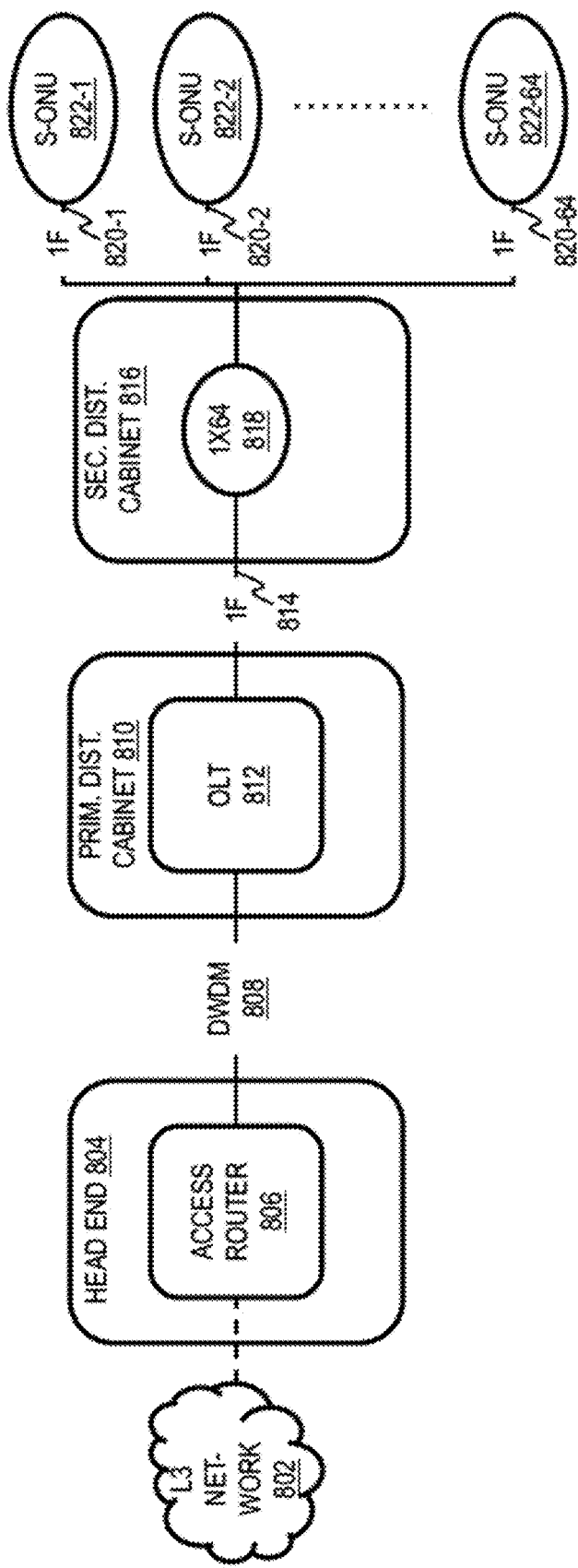
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 1802 generally represents the elements in FIG. 1 upstream of the head ends 150, while head end 1804, including access router 1806, is an alternative form of head end that can be used in lieu of or in addition to head ends 150 in one or more embodiments. Head end 1804 is suitable for FTTH implementations. Access router 1806 of head end 1804 is coupled to optical line terminal 1812 in primary distribution cabinet 1810 via dense wavelength division multiplexing (DWDM) network 1808. Single fiber coupling 1814 is then provided to a 1:64 splitter 1818 in secondary distribution cabinet 1816 which provides a 64:1 expansion to sixty-four S-ONUs 1822-1 through 1822-64 (in multiple premises) via sixty-four single fibers 1820-1 through 1820-64, it being understood that a different ratio splitter could be used in other embodiments and/or that not all of the 64 (or other number of) outlet ports are necessarily connected to an S-ONU.

Figure 9:
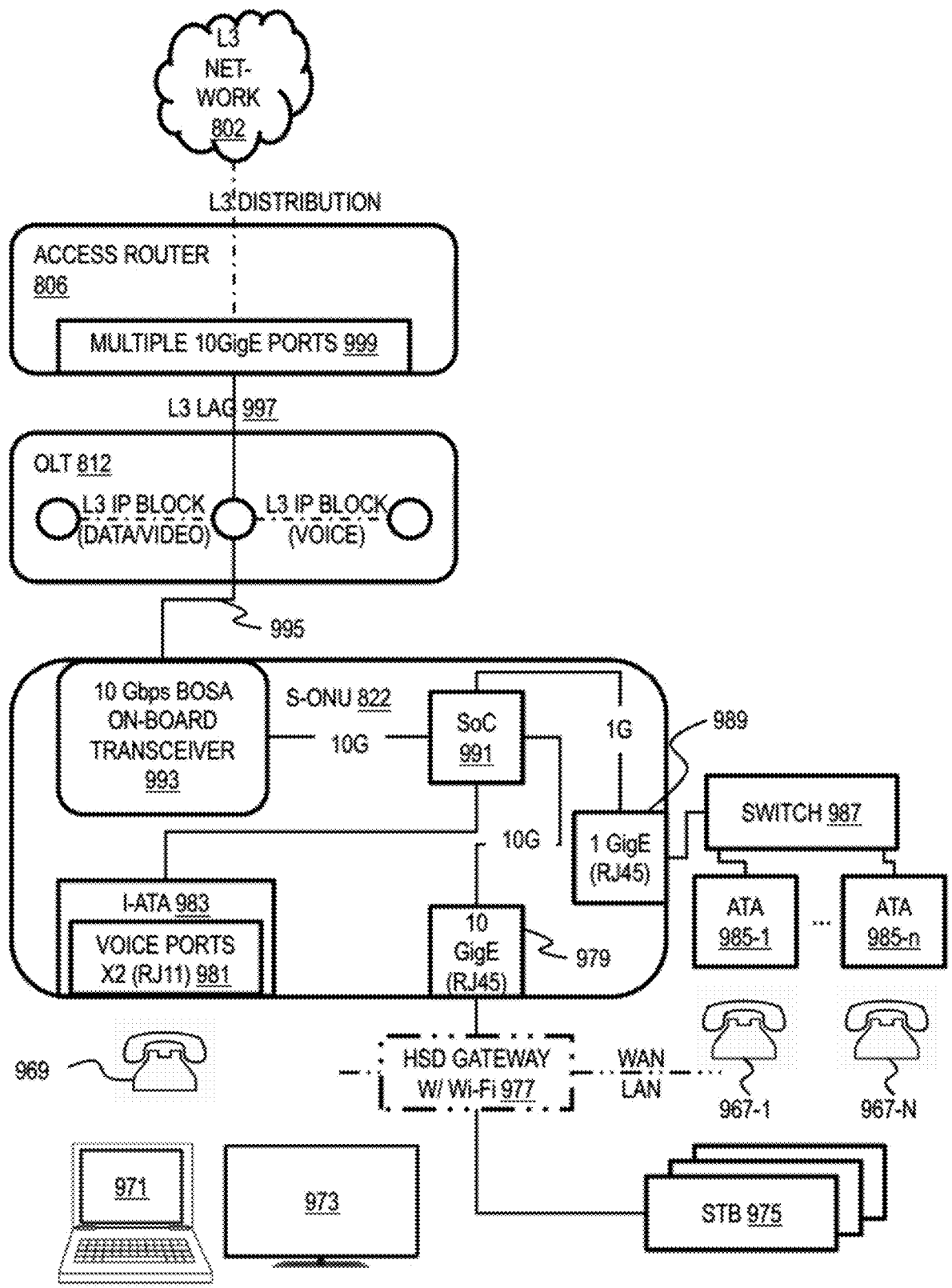
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 1806 is provided with multiple ten-Gigabit Ethernet ports 1999 and is coupled to OLT 1812 via L3 (layer 3) link aggregation group (LAG) 1997. OLT 1812 can include an L3 IP block for data and video, and another L3 IP block for voice, for example. In a non-limiting example, S-ONU 1822 includes a 10 Gbps bi-directional optical subassembly (BOSA) on-board transceiver 1993 with a 10G connection to system-on-chip (SoC) 1991. SoC 1991 is coupled to a 10 Gigabit Ethernet RJ45 port 1979, to which a high-speed data gateway 1977 with Wi-Fi capability is connected via category 5E cable. Gateway 1977 is coupled to one or more set-top boxes 1975 via category 5e, and effectively serves as a wide area network (WAN) to local area network (LAN) gateway. Wireless and/or wired connections can be provided to devices such as laptops 1971, televisions 1973, and the like, in a known manner. Appropriate telephonic capability can be provided. In a non-limiting example, residential customers are provided with an internal integrated voice gateway (I-ATA or internal analog telephone adapter) 1983 coupled to SoC 1991, with two RJ11 voice ports 1981 to which up to two analog telephones 1969 can be connected. Furthermore, in a non-limiting example, business customers are further provided with a 1 Gigabit Ethernet RJ45 port 1989 coupled to SoC 1991, to which switch 1987 is coupled via Category 5e cable. Switch 1987 provides connectivity for a desired number n (typically more than two) of analog telephones 1967-1 through 1967-$n$, suitable for the needs of the business, via external analog telephone adapters (ATAs) 1985-1 through 1985-$n$. The parameter "n" in FIG. 9 is not necessarily the same as the parameter "n" in other figures, but rather generally represents a desired number of units. Connection 1995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Principles of the present disclosure will be described herein in the context of apparatus, systems, and methods for insertion of modulated tones into a communications plant for leakage detection purposes, making radiation level measurements, and detecting RF leakage from the communications plant. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Nodes are points in a network where the HFC network converts from an optical based signal transmission system to a radio-frequency (RF) based transmission system confined within a coaxial cable or other communications conduit. The nodes are typically located inside MSO facilities that house the equipment. According to some embodiments, leakage detection sites are moved beyond these sites, improving detection capabilities. In a Distributed Access Architecture (DAA), the nodes of the network become more commonly deployed toward end users (e.g., groups of homes and businesses), away from the MSO facilities. According to some embodiments of the present invention, receivers positioned within these nodes enable the reception of leakage signals, or tones, output by equipment such as cable modems disposed at end user premises. According to one or more embodiments of the present invention, triangulation of RF leakage is possible based on propagation models, with knowledge of the nodes' geographical positions, which are typically spaced thousands of feet apart.

According to some embodiments, nodes are embodied as mini-CMTS devices, serving hundreds of customers, wireless 5G CBRS (Citizens Broadband Radio Service) devices, MDUs (Multiple Dwelling Units), etc. According to one or more embodiments, the nodes are typically strung in the HFC network.

According to some embodiments, a compute-capable node (e.g., CMTS node) is configured to convert optical signals to electric signals communicated over a coaxial cable. For example, a compute-capable node can receive IP traffic over an optical fiber, process the traffic packet-by-packet, converting the traffic to a DOCSIS-IP format communicated over an electrical coaxial cable.

According to some embodiments, the nodes can employ a CPU-in-the-middle approach for the purpose of packet switching, IP header filtering, security monitoring, etc. The compute function allows other applications to run inside the node, such as data logging of the transmit power of each connected cable modem. According to some aspects, the CPUs of the nodes are high-capacity devices with local memory (e.g., Flexible MAC Architecture (FMA)/DAA architectures) supporting containerized applications.

It should be understood that the FMA nodes are positioned relatively close to the cable modems, as compared to nodes disposed at a head-of-plant CMT type nodes. The FMA nodes typically service hundreds of modems. According to some embodiments, the FMA nodes are configured as virtual or mini CMTS devices. According to some embodiments, wireless 5G CBRS (Citizens Broadband Radio Service) nodes are contemplated.

Currently RF bands between 9 kHz and 275 GHz are allocated (e.g., designated for use by one or more terrestrial or space radio-communication services). DOCSIS systems generate RF signals across a band of the radio spectrum, typically from 5 MHz to 1.2 GHz, and beyond. The band used by DOCSIS systems crosses certain allocated bands, for example, the aeronautical spectrum, currently recognized as 118-137 MHz, 225-328.6 MHz, and 335.4-400 MHz. According to some aspects of the present invention, these allocated bands can be technologically protected from interference caused by RF leakage. Typically, the RF signals generated within the DOCSIS system are contained in components of the system including coaxial cable, taps, splitters, combiners, etc. However, if the coaxial cable, or another component, is compromised (e.g., by damaged coaxial shielding), or if the end of the coaxial cable is not terminated correctly, RF signals can leak into a surrounding environment, creating interference.

The following description references a pre-high-split configuration and a post-high-split configuration of the DOCSIS system. These refer to an update in the DOCSIS system, wherein a split in the spectrum band between an upstream section and a downstream section has been moved from a low split point to a high split point. Embodiments of the present invention are applicable to these and other configurations, and to upstream and downstream data transmissions. It should be understood that upstream transmissions are generally from a terminus (e.g., a terminus device such as a cable modem) toward a node (e.g., a head end), and that downstream transmissions are generally from the source toward the terminus. It should be understood that the node can be, for example, a head end, hub server, fiber node, local servicing node, etc.

In the pre-high-split configuration, the upstream spectrum is allocated to 5-42 MHz or 5-45 MHz, and the downstream spectrum is allocated to 54-1200 MHz and higher. The pre-high-split configuration places the aeronautical spectrum in the downstream spectrum of the DOCSIS spectrum. In the downstream spectrum, a transmit signal is strongest (e.g., as high as about 65 decibel millivolt (dBmv)) at the node and becomes weaker (attenuates) as it propagates towards connected cable modems (CMs).

In the post-high-split configuration, the upstream spectrum is allocated to above 108 MHz, and extends higher in 96 MHz chunks. In the post-high-split configuration, the aeronautical band is in the upstream spectrum of the DOCSIS spectrum. In the upstream spectrum, the strongest potential interfering signals are generated by the cable modems (e.g., at a subscriber's premises). Typically, the cable modems are capable of transmitting in an upstream direction of at least 65 dBmv. This can create a more difficult environment for testing RF leakage, for example, as the potential number of egress points for a signal can be larger than in the downstream environment close to the node(s).

It should be appreciated that an unterminated RF connector can be a source of egress of RF radiation into the environment from coaxial cable. In the post-high-split configuration, the aeronautical band is in the upstream spectrum of the DOCSIS spectrum, which typically has more points of potential RF egress than the downstream spectrum due to unterminated RF connectors being relatively common at customer locations (e.g., subscriber's premises). Stated another way, in a typical system there are more cable modems than there are CMTS devices, such that there are also more potential and/or actual unterminated or leaking RF connectors (for example, an RF splitter in a home having an unterminated port).

Typically, technicians with leakage detection meters traverse the environment around the cable plant, including the coaxial cable distribution, in search of RF signals leaking into the environment. In a case that a signal is detected (i.e., a signal detected in the environment outside of the cable plant), a source of the leakage is identified and repaired.

Embodiments of the present invention may render conventional leakage detection methods unnecessary. For example, conventional leakage detection methods rely on known fixed frequency tones having a high frequency (i.e., in or near a band of interest, such as the aeronautical band) in combination with drive-by receiver equipment to locate a source of the signal leakage. These conventional methods require the detection of leakage signals in an area, and the eventual location of an egress point by a technician dispatched to the area. Further, in the case of a detected leakage signal, there may be more than one egress point in a given area.

Embodiments of the present invention reduce or eliminate the need for manual, drive-by, leakage detection. For example, according to some embodiments of the present invention, RF leakage can be eliminated in a selected band(s) by distributing capacity across a spectrum within a cable network according to a signal strength needed for communication between a cable modem and a node.

Figure 10:
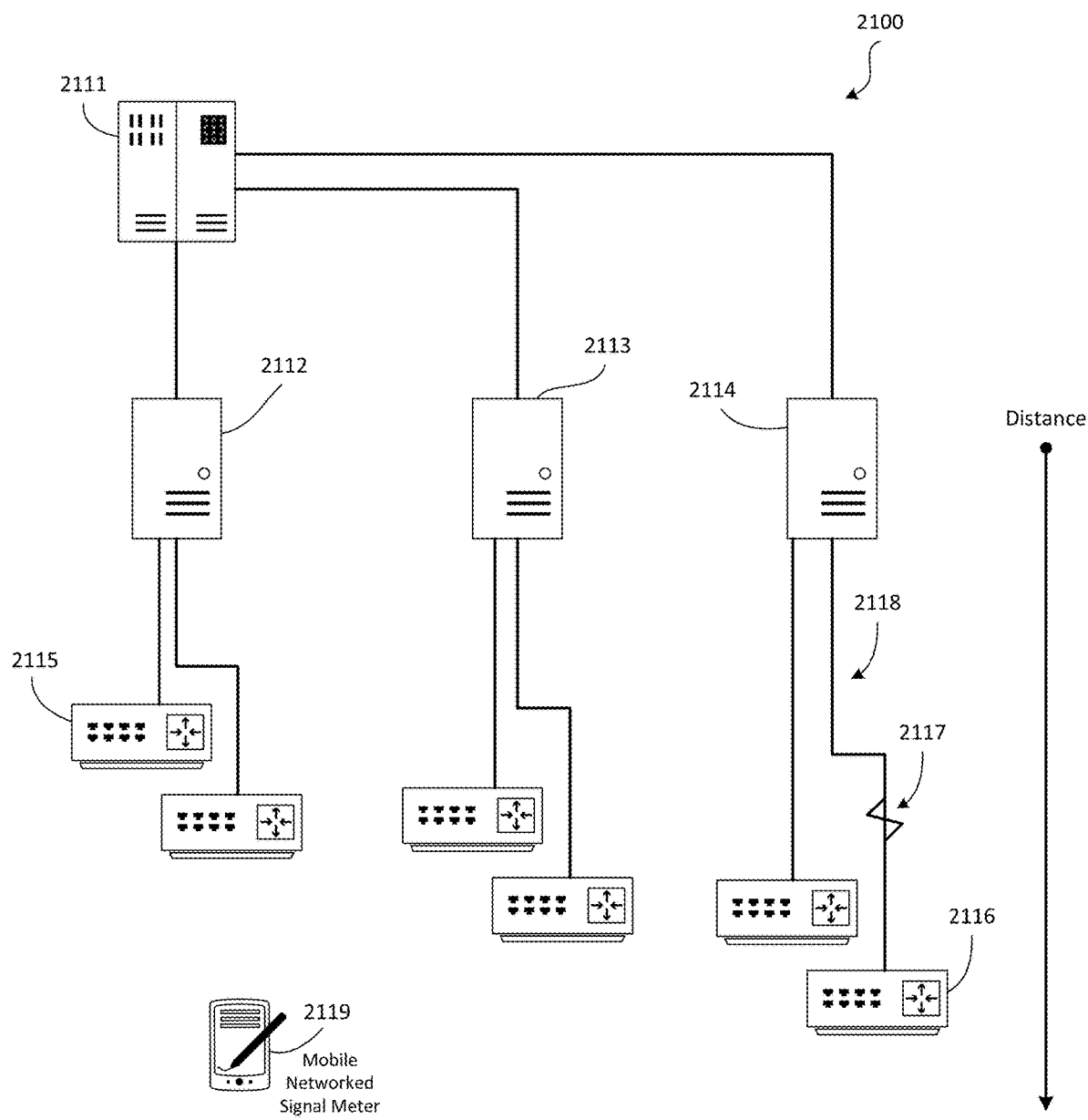
FIG. 10 is a diagram of a network having potential ingress and egress points for RF leakage.

FIG. 10 is a diagram of a cable network in accordance with an example embodiment. As shown in FIG. 10, a cable plant network 2100 includes a first node 2111, such as a head end, and second, third and fourth nodes 2112, 2113, 2114 (such as CMTS or Flexible MAC Architecture (FMA) nodes). The cable plant network 2100 includes a plurality of cable modems including a first cable modem 2115 and a second cable modem 2116. The first cable modem 2115 is connected to the second node 2112 and the second cable modem 2116 is connected to the fourth node 2114. FIG. 10 illustrates a break 2117 in the coaxial cable 2118 causing RF leakage. Further, the cable plant network 2100 is configured to allow communication with wireless devices, such as a mobile networked signal meter 2119.

According to at least one embodiment, when a cable modem is brought online (i.e., establishing a connection to a node (e.g., CMTS, FMA nodes, etc.), the cable modem performs a ranging process to determine a transmit power or level for signals to be transmitted to the node. According to some embodiments, the transmit power is calculated such that a signal that is transmitted from the cable modem to the node arrives at approximately 0 dBmV at the node. It should be understood that 0 dBmV is a design choice, and that other values can be used without departing from the scope of the present disclosure. According to one or more embodiments of the present invention, cable modems that are relatively close to the node will be configured to transmit at lower levels than cable modems that are relatively far away. According to at least one aspect, these different signal levels can be selected to overcome signal attenuation. Signal attenuation can be a function of the distance a signal travels through a coaxial cable (e.g., closer to, or farther from, a node or cable modem), a number of connections (e.g., couplings, signal splitters, etc.), propagation delay, etc.

Figure 11:
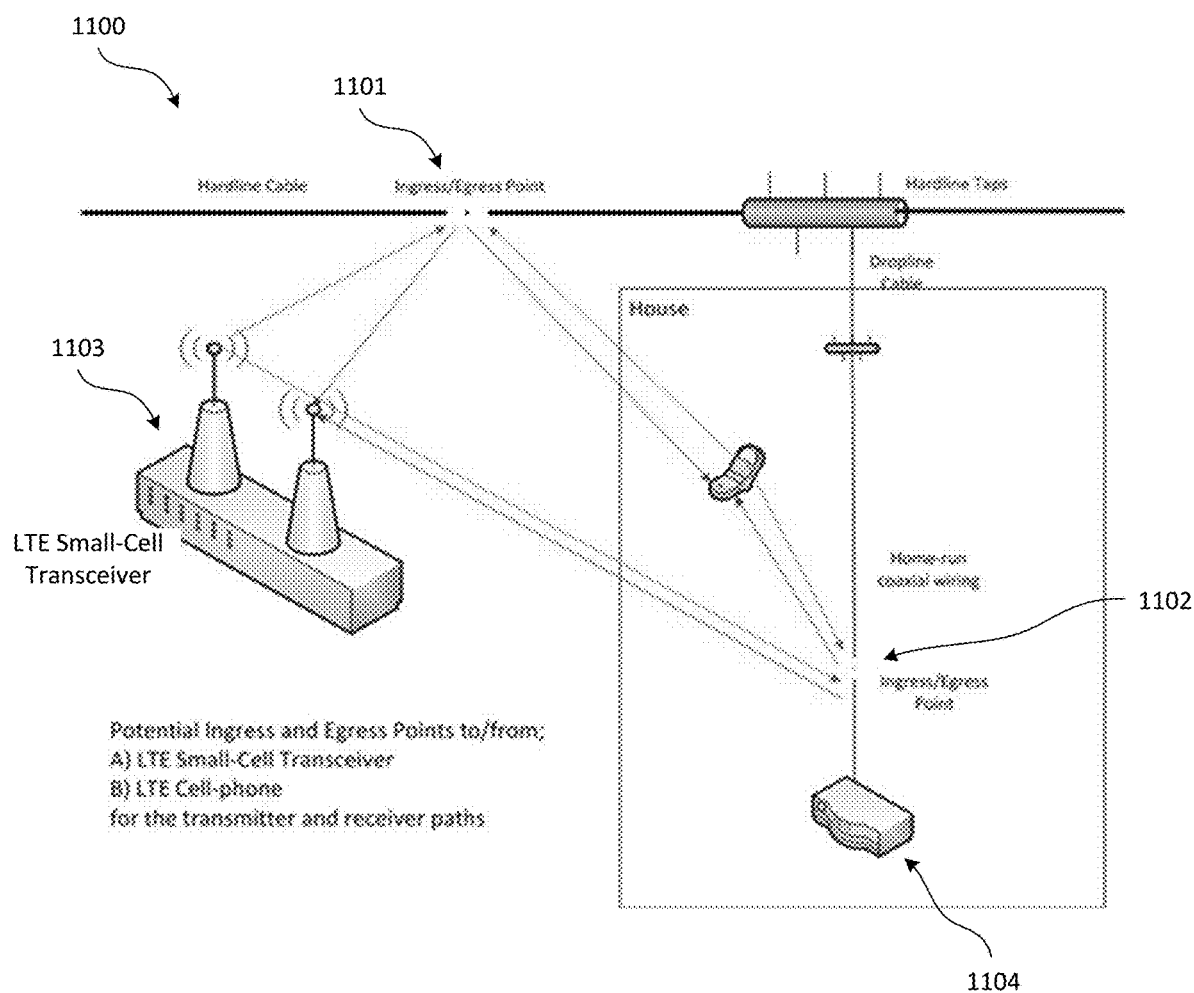
FIG. 11 is a diagram of a cable network plant in accordance with an example embodiment.

Referring to FIG. 11, RF leakage from an HFC plant infrastructure 1100 can occur at any point within a network system, including from within a customer's premises. An egress/ingress point for RF leakage can be at any point in the network system (e.g., 1101, 1102), including from equipment and connection points. Interference with mobile radio systems, such as LTE cellular service providers, can occur when an egress point in the network becomes a transmitter into a local environment. For example, in a case where the cable signals carried by the network operate at the same frequencies as those used by a 4G-LTE cellular system (e.g., operating around 650, 750, 850 and 950 MHz) and leak from the egress point, the signals may interfere with the mobile radio signals. Such interference can overlap (completely or partially) with other frequency bands, such as the civil aviation communications band of 108-137 MHz.

FIG. 11 shows a LTE-small cell receiver 1103 disposed for detection of RF leakage from the ingress/egress points. The LTE-small cell receiver 1103 can be replaced by another device, such as (for example) a DOCSIS node with omnidirectional antennas, or the like, configured to detect RF leakage. According to one or more embodiments, the LTE-small cell receiver 1103 may be integrated into/with the cable modem 1104 in a high-split configuration, and in a case where leakage of an upstream transmission is detected, the upstream transmission can be shifted to a non-protected (e.g., non-aeronautical) band.

It should be understood that practically every piece of equipment within the network system (e.g., a cable plant network) represents a potential RF radiator. The types of equipment disposed within the system can be divided by physical location into outdoor plant equipment and indoor consumer premises equipment. Within both of these categories of equipment are different types of coaxial cable and equipment. The outdoor plant equipment includes, for example, nodes, hardline coaxial cable and connectors, amplifiers, taps, drop coaxial cable and connectors, filters or traps, power supplies, power insertors, outdoor cable modems, etc. The indoor consumer premises equipment includes, for example, home-run coaxial cable and connectors, amplifiers, splitters, filters (channel/band and MoCA), high-speed data cable modems, advanced wireless gateways, set-top boxes (analog/digital, DVR, non-DVR, DTA's), etc. All of the equipment has a designed-in level of shielding effectiveness, which can vary due environmental conditions or ageing effects.

According to some embodiments, when a cable modem is added to the cable plant, a node provisions the cable modem, wherein the node and the cable modem exchange data in a ranging process. According to at least one embodiment, the ranging process includes determining a distance between the node and the cable modem, and determining a transmit power (e.g., signal strength) that the cable modem is to use to transmit data in the upstream direction. According to some aspects, the transmit power is selected to ensure reliable communications with the node. It should be understood that different concepts of "reliable" can be used without departing from the scope of the present disclosure. According to one example, a reliable communication has an empirical availability metric know as 39's (or 99.9%) or better. Similar measures of reliability/empirical availability are applicable to cellular systems. The node also provisions the cable modem to use one or more of the available upstream channels. According to one or more embodiments, one way to prevent interference into a band of interest (e.g., the aeronautical band) is to provision the cable modem to use portions of the spectrum higher and/or lower than the band of interest, removing that portion of the spectrum from communications between the cable modem and the node.

According to some embodiments, a ranging process can be implemented at startup to determine a distance between the node and the cable modem. According to some embodiments, for cable modems relatively close to a node, a transmit power can provisioned to have a low level (e.g., below a specified threshold) and to use a portion of the radio spectrum that includes the band of interest. According to some embodiments, for cable modems relatively far from a node, a transmit power can be provided to have a high level (e.g., above a specified threshold) and to exclude the band of interest (or a portion thereof). According to at least one aspect, a cable modem relatively close to a node will transmit at relatively low level (e.g., below a leakage limit specified by the FCC or similar governmental authority). Accordingly, any RF leakage in the band of interest will have a power below a predetermined threshold. According to one or more embodiments, a node monitors (continuously or periodically) and logs a transmit power provisioned to the cable modem, and upon detecting an unexpected change in the transmit power, can generate a ticket to resolve the situation. According to some embodiments, the node, upon determining the unexpected transmit power, can automatically reconfigure one or more cable modems (e.g., according to FIG. 13A or FIG. 14).

According to some embodiments, distributing capacity across a spectrum within a cable network according to signal strength requirements, OUDP (OFDMA Upstream Data Profile) implementations can be omitted because transmission levels can be managed below FCC thresholds (where the FCC thresholds are an example requirement).

Figure 12:
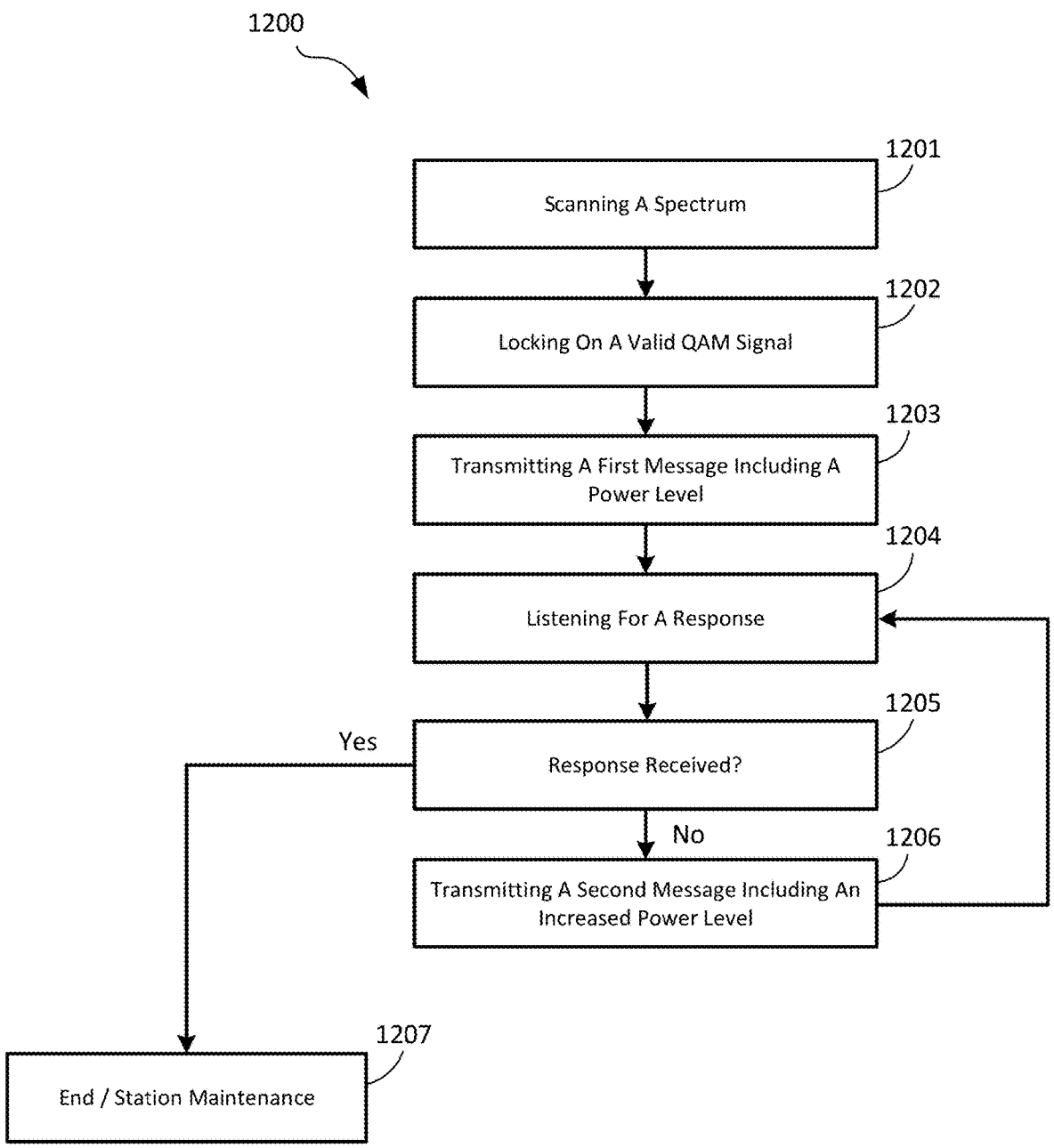
FIG. 12 is a flow diagram of a ranging method of configuring a cable modem in accordance with an example embodiment.

According to some embodiments and referring to FIG. 12, a ranging process 1200 determines a transmit power of the cable modem needed to overcome attenuation between the cable modem and the node. According to some aspects, the ranging process 1200 performed by a cable modem connected to a cable plant includes scanning a spectrum at step 1201, locking onto a valid signal received from a node (e.g., a CMTS) of the cable plant at step 1202, transmitting a first message at step 1203, e.g., a low-power signal of 8 dBmV, that includes information about a transmit power that the cable modem is using to transmit the first message to the node, listening for a response from the node at step 1204, wherein the response includes the transmit power information used by the cable modem, determining whether a response is received at step 1205, and in a case that no response is received by the cable modem, the cable modem increases the transmit power (e.g., by 3 dB), prepares a subsequent message that include information about the increased transmit power, and transmits the second message at step 1206. It should be understood that the ranging process may include assigning an SID to the cable modem. According to some embodiments, step 1204, step 1205, and step 1206 are repeated until a response is received from the node at step 1205.

According to at least one embodiment, in a case that a response is received by the cable modem at step 1205, the cable modem exits the ranging process 1200 at step 1207.

According to some aspects, scanning the spectrum at step 1201 can be performed upon a power up of the cable modem. According to some aspects, scanning the spectrum at step 1201 includes scanning a full spectrum of the cable plant (e.g., about 0 MHz to 1.8 GHz), a downstream spectrum, another predetermined spectrum, etc.

According to some aspects, at step 1202 the cable modem locks onto a valid QAM (Quadrature Amplitude Modulation) signal in the downstream spectrum.

According to at least one embodiment, determining whether a response is received at step 1205 can include confirming a valid response by comparing a transmit power specified in a received response to the transmit power information specified by the cable modem.

According to some aspects, once the cable modem has received its first range-response from the node, the cable modem moves to a station maintenance routine at step 1207. According to some embodiments, the node can send requests to the cable modem to make adjustments to the cable modem's transmitting frequency, amplitude, and timing offset to tune the cable modem, and the cable modem responds. These updates can occur periodically, e.g., at least once every 30 seconds.

According to some embodiments, a distance between the cable modem and the CMTS can be related to the signal attenuation between the cable modem and the CMTS. It should be understood that a distance interpretation does not necessarily calculate a physical distance; the distance interpretation determines a measure (e.g., a unitless numeric variable) that can be compared among different cable modems, and cable modem-node pairs.

According to at least one embodiment, a distance between the CM and the CMTS is interpreted based on measured delay (e.g., propagation delay) through the cable plant. According to some aspects, a distance interpretation using a propagation delay can be more accurate than a measure determined based on attenuation when delay components are of the same class (e.g., all the coaxial cable has the same propagation characteristics, all the amplifiers have the same delay characteristics, etc.). The accuracy of the distance calculation can be improved in cases where the characteristics of the components of the cable plant are known and can be accounted for in calculations, for example, where the cable plant maintains a record of the component characteristics.

Figure 13A:
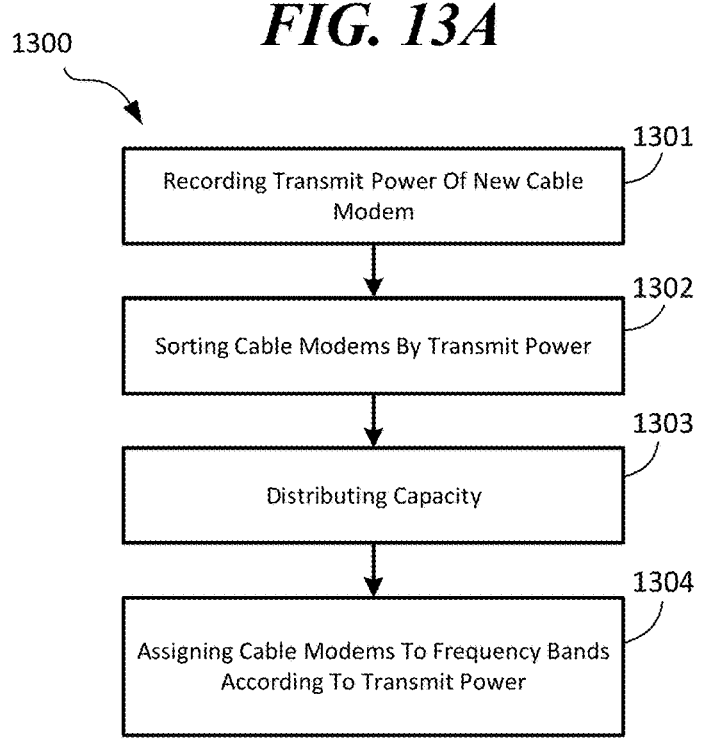
FIG. 13A is a flow diagram of a first example method of distributing capacity across a spectrum within a cable network in accordance with an example embodiment.
Figure 14:
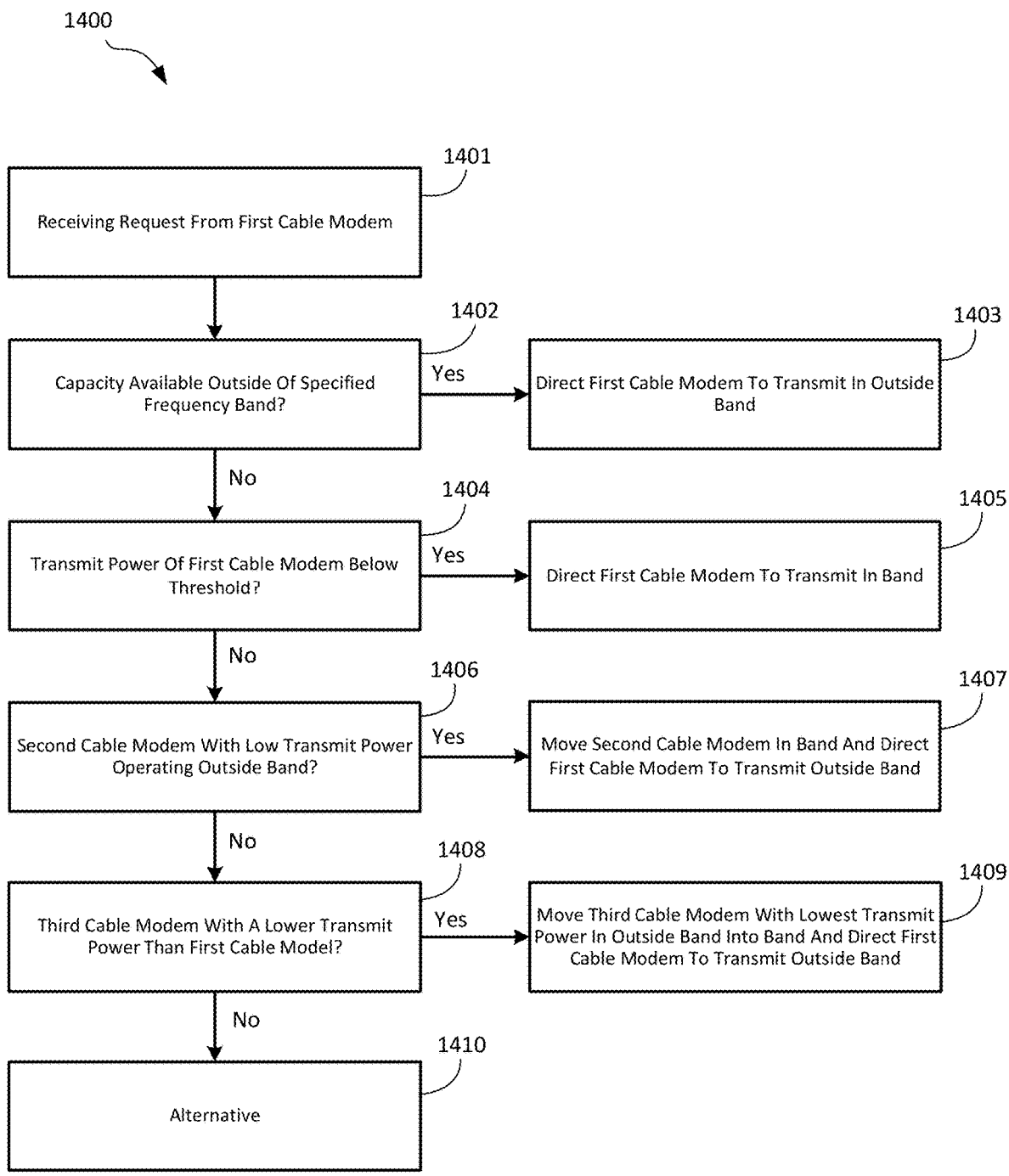
FIG. 14 is a flow diagram of a third method of distributing capacity across a spectrum within a cable network in accordance with an example embodiment.

According to some embodiments, as each cable modem is added, the node builds a record of the transmit power for that cable modem. FIG. 13A and FIG. 14 are example methods performed by a node (e.g., CMTS) for allocating capacity.

According to some embodiments and referring to FIG. 13A, a first example assignment process 1300 includes adding a cable modem to a service group and recording a cable modem transmit power at step 1301, sorting the cable modems at step 1302 from a lowest transmit power to a highest, distributing a capacity across the spectrum at step 1303 to determine a number of cable modems that can be allocated to operate in one or more specified frequency bands (e.g., an aeronautical band), and assigning cable modems having the lowest transmit power to the specified frequency band(s) at step 1304. According to some aspects, logged cable modem transmit power levels are using in determining the number of cable modems that can be allocated to operate in one or more specified frequency bands at step 1303.

According to some embodiments, the sorting of the cable modems at step 1302 may be omitted, wherein the distribution of capacity at step 1303 can include identifying/selecting a next one of the plurality of cable modems to be allocated based on a lowest transmit power level.

According to some embodiments, the distribution of capacity at step 1303 includes determining a first set of the plurality of cable modems that can be allocated to the specific frequency band available for upstream communications according to an aggregation of the transmit power levels of the first set of the plurality of cable modems. According to at least one aspect, the aggregation is less than a threshold total transmit power. According to some embodiments, a first cable modem of the plurality of cable modems is added to the first set, the first cable modem having a lowest transmit power among the plurality of cable modems; and successive ones of the plurality of cable modems are added to the first set based on lowest transmit power levels, such that the aggregation of the transmit power levels of the first set of the plurality of cable modems does not exceed the threshold total transmit power. According to at least one embodiment, the addition of the successive ones of the plurality of cable modems includes ensuring that the aggregation of the transmit power levels of the first set of the plurality of cable modems does not exceed the threshold total transmit power for the specified frequency band.

According to another aspect, at step 1303 a processor may take logged transmit power levels of the cable modems and calculate whether the combined power of the cable models is greater than (i.e., capable of exceeding) an RF leakage threshold.

Figure 13B:
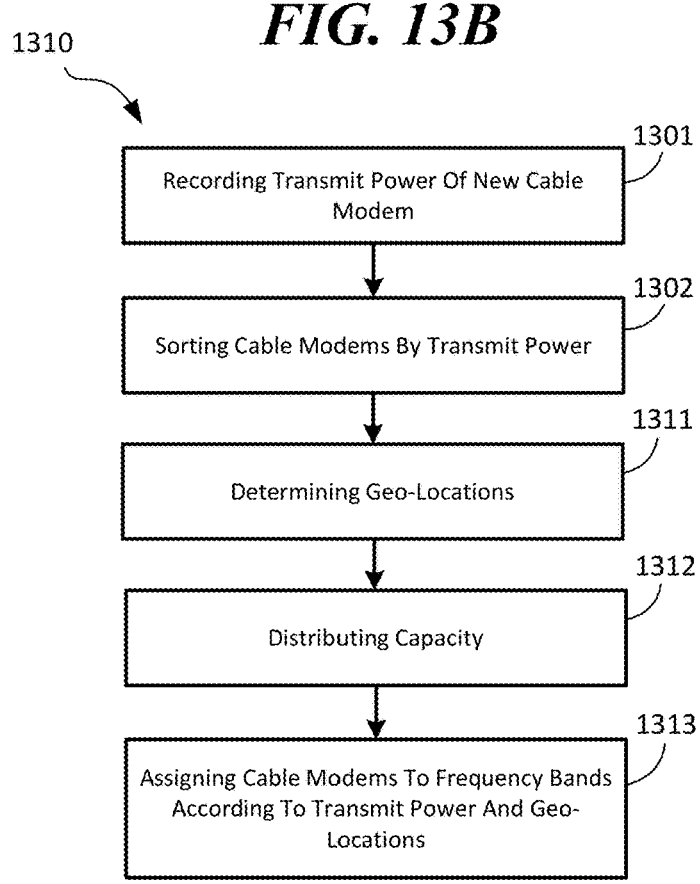
FIG. 13B is a flow diagram of a second example method of distributing capacity across a spectrum within a cable network in accordance with an example embodiment.

According to still another aspect and referring to FIG. 13B, in a second example assignment process 1310, given known geo-locations of the cable modems and a structure of the cable plant (e.g., stored in a database) at step 1311, cable modems that are geographically separated (dispersed) from one another, such that they are different on branches of the coaxial distribution plant, will have less impact on generating additive RF leakage over the geographic area than if the cable modems are on a same branch. According to at least one embodiment, potential RF leakage can disperse over the cable plant by dispersing cable modems transmitting in a band of interest (e.g., the aeronautical band) over a geographic area at step 1312 and step 1313, reducing an impact of any leakage as compared to more concentrated assignment of the band of interest. That is, step 1312 and step 1313 consider a combination of aggregate transmit power within a band of interest and geographic separation, for example, to arrive at a minimum potential RF leakage in any given geographic area. Here, a multivariable function may be used to determine the distribution of the capacity at step 1312.

According to some embodiments and referring to FIG. 14, a third example assignment process 1400 includes receiving a request from a first cable modem for permission to transmit at step 1401, determining whether capacity is available outside of a specified frequency band at step 1402, and in a case that the capacity is available, directing the first cable modem to transmit in a band outside of the specified frequency band at step 1403, and otherwise determining whether the first cable modem has a transmit power below a threshold at step 1404. According to some aspects, the threshold at step 1404 can be a pre-determined transmit power. In a case that the first cable modem has a transmit power below the threshold, directing the first cable modem to transmit in the specified frequency band at step 1405, otherwise determining whether a second cable modem has a low transmit power and is operating outside of the specified band at step 1406, and if so, directing the second cable modem to move into the specified band and directing the first cable modem to transmit outside of the specified frequency band at step 1407. In a case where there is no second cable modem having a low transmit power operating outside of the specified band, the method may include moving a third cable modem having a lower transmit level than the first cable modem (see step 1408) and a lowest transmit power outside of the specified frequency band (see step 1409) into the specified band, and directing the first cable modem to transmit outside of the specified frequency band at step 1409. Otherwise, at step 1410, the method may include one or a number of alternatives including permitting the first cable modem to transmit in the band of interest or precluding the first cable modem from transmitting until an aggregate power of the cable modems transmitting in the band of interest drops below a threshold. These alternatives may be selected/configured according to a particular application.

According to some embodiments, the third example assignment process 1400 can include rank-ordering all requesting cable modems based on respective transmit power levels upon each request, wherein non-specified bands (e.g., non-aeronautical spectrum bands) are filled first.

According to some embodiments, a fourth example assignment process (e.g., a simplified embodiments of the third example assignment process 1400) can include assigning cable modems outside of the band of interest until the portion of the spectrum outside of the band of interest is full, and subsequently when an additional cable modem is to be added, identifying a cable modem having a lower transmit power that is also outside of the band of interest and moving that cable modem it into the band of interest. The process of adding an additional cable modem may be repeated until the spectrum outside of the band of interest is full, or the spectrum outside of the band of interest meets or exceeds a power threshold.

According to one or more embodiments, example assignment processes may be considered a static in a case where cable modems are sorted by transmit power and assigned to frequency bands, where the configuration is left until a next allocation of the cable modems. According to one or more embodiments, example assignment processes may be considered a dynamic in a case where cable modems may be moved individually, on-the-fly, in the spectrum to lower an aggregate transmit power in a band of interest.

Figure 15:
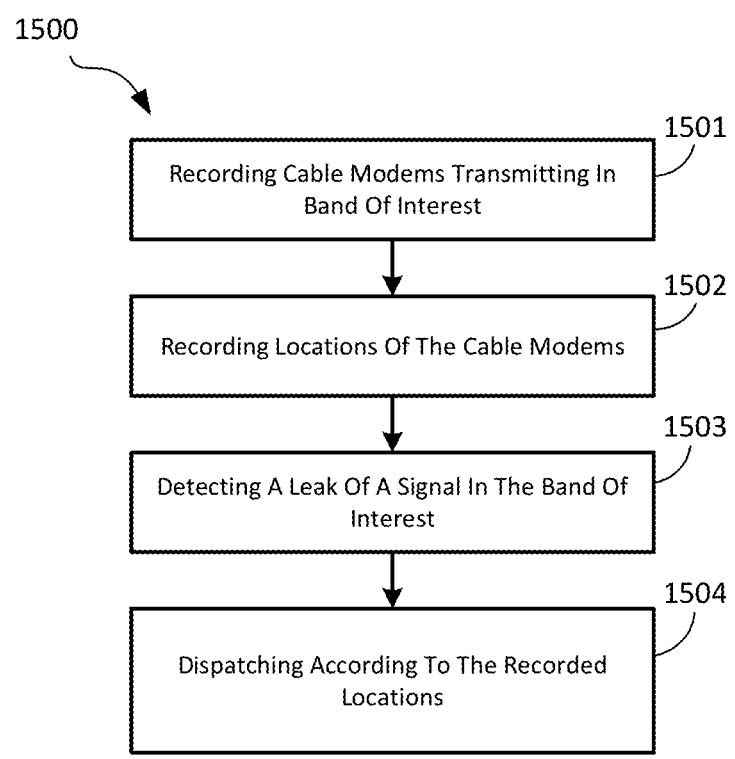
FIG. 15 is a flow diagram of a method of dispatching a technician in accordance with an example embodiment.

One or more embodiments of the present invention can be implemented in conjunction with leakage detection methods. According to some embodiments and referring to FIG. 15, a method of dispatching a technician 1500 includes recording, by a node, an identification of each of the cable modems that have been allocated to transmit in the band of interest at step 1501 and recording the location of these cable modems 1502. For example, the location of the cable modems may be determined from geo-location equipment of the cable modem or retrieved from a database of locations data provided by the customers associated with the cable modem. Upon determining a leak of a signal in the band of interest at step 1503, a technician can be dispatched according to the location of the cable modems known to be transmitting in this band at step 1504. That is, locations of cable modems transmitting out of the band of interest are eliminated as potential locations of the leak.

According to one or more embodiments, other example leakage detection methods can include a system assessing a normal background leakage level and finding any continuous or periodic leakage points of transmissions from a single modem or groups of modems transmitting an identifiable signal according to a schedule, aggregating and triangulating multiple measurements across multiple nodes to determine a leakage level at an egress point and to locate a position of the egress point, reporting an aggregation of detection data from across multiple nodes within the same region to a centralized computer, e.g., a scheduler, and collecting an aggregation of the detection data from across multiple nodes within the same region by a compute-capable node within any of the nodes or by an application distributed across a number of the nodes.

Recapitulation:

According to some embodiments, a method 1300, performed by a node, of provisioning a plurality of cable modems connected to the node includes: recording a respective transmit power level for each cable modem of the plurality of cable modems at step 1301; determining a first set of the plurality of cable modems that can be allocated to a specified frequency band available for upstream communications according to an aggregation of the transmit power levels of the first set of the plurality of cable modems at step 1303; and provisioning each cable modem of the first set to use at least a portion of the specified frequency at step 1304.

According to some embodiments, the method 1300 includes sorting the plurality of cable modems by the transmit power levels 1302, wherein determining the first set of the plurality of cable modems at step 1303 further includes: adding a first cable modem of the plurality of cable modems to the first set, the first cable modem having a lowest transmit power level among the plurality of cable modems; and adding successive ones of the plurality of cable modems, sorted by the transmit power levels, to the first set based on a lowest transmit power level such that the aggregation of the transmit power levels of the first set of the plurality of cable modems does not exceed a threshold total transmit power level.

In one aspect, an exemplary method, performed by a node, of provisioning a plurality of cable modems connected to the node, includes: receiving a request from a first cable modem of the plurality of cable modems for provisioning at step 1401; determining that capacity is available outside of a specified frequency band at step 1402; directing the first cable modem to transmit in a band outside of the specified frequency band at step 1403; receiving a request from a second cable modem of the plurality of cable modems for provisioning at step 1401; determining that capacity is not available outside of a specified frequency band at step 1402; determining that a transmit power level of the second cable modem is below a threshold for the specified frequency band at step 1404; and directing the second cable modem to transmit in at least a portion of the specified frequency band at step 1405.

According to some embodiments, a system includes: a node (e.g., first node 2111 or second 2112) comprising a processor (720) and a memory (730); a plurality of terminus devices (e.g., first cable modem 2115); and a network (e.g., HFC plant infrastructure 1100) connecting the node and the plurality of terminus devices, wherein the network comprises a coaxial cable portion configured to carry signals in a radio spectrum, wherein the node is configured to allocate a portion of the radio spectrum to each terminus device of the plurality of terminus devices, to set a signal transmit power for each terminus device of the plurality of terminus devices, and to limit an aggregate signal transmit power of a set of the terminus devices allocated to transmit signals in a specified frequency band of the radio spectrum. According to some aspects, the signal transmit power set by the node is sufficient to communicate a reliable signal from a respective terminus device of the plurality of terminus devices to the node. According to some aspects, the node is configured to determine a geo-location of each terminus device of the plurality of terminus devices, wherein the limitation of the aggregate signal transmit power has a geographic component dispersing the allocated portion of the radio spectrum in the specified frequency band over a geographic area defined by the plurality of terminus devices.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
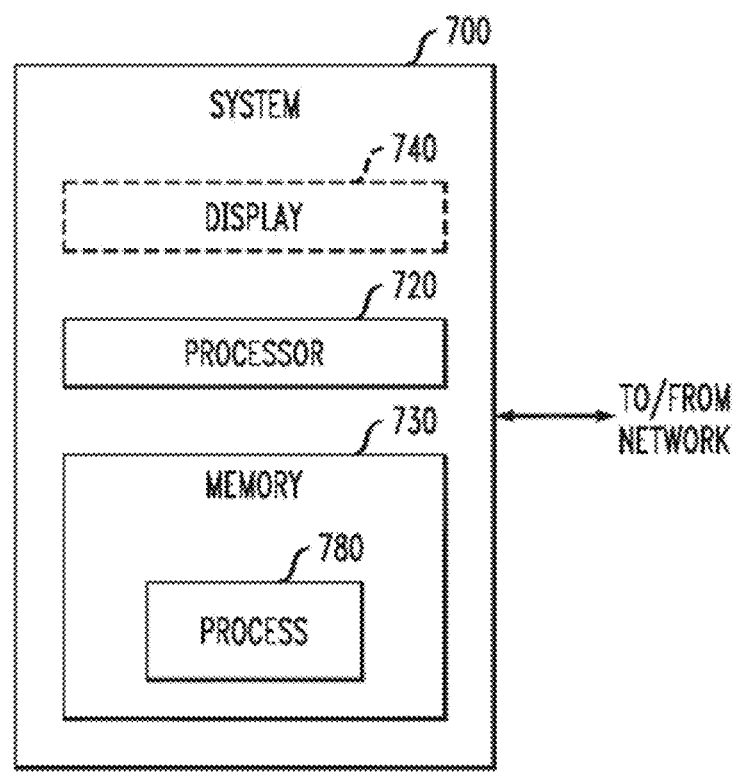
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatus or modules shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, performed by a node, of provisioning a plurality of cable modems connected to the node, the method comprising:
    obtaining an identification of a specified frequency band susceptible to radio frequency interference;
    recording a respective transmit power level for each cable modem of the plurality of cable modems;
    determining a first set of the plurality of cable modems that can be allocated to the specified frequency band available for upstream communications according to an aggregation of the transmit power levels of the first set of the plurality of cable modems wherein the first set of the plurality of cable modems comprises cable modems aggregately characterized by lower transmit power levels compared to cable modems of a second set of the plurality of cable modems; and
    reducing radio frequency interference of the specified frequency band by provisioning each cable modem of the first set to use at least a portion of the specified frequency band.

2. The method of claim 1, further comprising sorting the plurality of cable modems by the transmit power levels,
    wherein determining the first set of the plurality of cable modems comprises:
    adding a first cable modem of the plurality of cable modems to the first set, the first cable modem having a lowest transmit power level among the plurality of cable modems; and
    adding successive ones of the plurality of cable modems, sorted by the transmit power levels, to the first set based on a lowest transmit power level such that the aggregation of the transmit power levels of the first set of the plurality of cable modems does not exceed a threshold total transmit power level.

3. The method of claim 2, wherein the addition of the successive ones of the plurality of cable modems comprises ensuring that the aggregation of the transmit power levels of the first set of cable modems does not exceed the threshold total transmit power level for the specified frequency band.

4. The method of claim 1, further comprising determining a location of at least two of the cable modems of the plurality of cable modems,
    wherein the determination of the first set of the plurality of cable modems that can be allocated to the specified frequency band available for upstream communications is performed according to the aggregation of the transmit power levels of the first set of the plurality of cable modems and a separation of the at least two cable modems.

5. The method of claim 1, further comprising:
    recording an identification of each cable modem of the first set;
    recording a location of each cable modem of the first set;
    receiving information about a leak of a signal in the specified frequency band; and
    dispatching a technician using the locations of the cable modems of the first set.

6. A method, performed by a node, of provisioning a plurality of cable modems connected to the node, the method comprising:
    receiving a request from a first cable modem of the plurality of cable modems for provisioning;
    obtaining an identification of a specified frequency band susceptible to radio frequency interference;
    determining that capacity is available outside of the specified frequency band;
    directing the first cable modem to transmit in a band outside of the specified frequency band;
    receiving a request from a second cable modem of the plurality of cable modems for provisioning;
    determining that capacity is not available outside of a specified frequency band;
    determining that a transmit power level of the second cable modem is below a threshold for the specified frequency band; and
    reducing radio frequency interference of the specified frequency band by directing the second cable modem to transmit in at least a portion of the specified frequency band.

7. The method of claim 6, further comprising:
    receiving a request from a third cable modem of the plurality of cable modems for provisioning;
    determining that capacity is not available outside of a specified frequency band;
    determining that a transmit power level of the third cable modem is above a threshold for the specified frequency band;
    determining that a fourth cable modem has a transmit power level below the threshold and is operating outside of the specified frequency band;
    directing the fourth cable modem to move into at least a portion of the specified frequency band; and
    directing the third cable modem to transmit outside of the specified frequency band.

8. The method of claim 6, further comprising:
    receiving a request from a fifth cable modem of the plurality of cable modems for provisioning;
    determining that capacity is not available outside of a specified frequency band;
    determining that a transmit power level of the fifth cable modem is above a threshold for the specified frequency band;
    determining that no other cable modem of the plurality of cable modems has a transmit power level below the threshold and is operating outside of the specified frequency band;

moving a sixth cable modem having a lowest transmit power level among a set of cable modems operating outside of the specified frequency band into the specified frequency band; and directing the fifth cable modem to transmit outside of the specified frequency band.

9. The method of claim 6, further comprising:
recording an identification of the second cable modem;
recording a location of the second cable modem;
receiving information about a leak of a signal in the specified frequency band; and
dispatching a technician using the location of the second cable modem.

10. A non-transitory computer readable medium comprising computer executable instructions which when executed by a computer cause the computer to perform a method of provisioning a plurality of cable modems connected to a node, the method comprising:
obtaining an identification of a specified frequency band susceptible to radio frequency interference;
recording a respective transmit power level for each cable modem of the plurality of cable modems;
determining a first set of the plurality of cable modems that can be allocated to the specified frequency band available for upstream communications according to an aggregation of the transmit power levels of the first set of the plurality of cable modems wherein the first set of the plurality of cable modems comprises cable modems aggregately characterized by lower transmit power levels compared to cable modems of a second set of the plurality of cable modems; and
reducing radio frequency interference of the specified frequency band by provisioning each cable modem of the first set to use at least a portion of the specified frequency band.

11. The computer readable medium of claim 10, further comprising sorting the plurality of cable modems by the transmit power levels,
wherein determining the first set of the plurality of cable modems comprises:
adding a first cable modem of the plurality of cable modems to the first set, the first cable modem having a lowest transmit power level among the plurality of cable modems; and
adding successive ones of the plurality of cable modems, sorted by the transmit power levels, to the first set based on a lowest transmit power level such that the aggregation of the transmit power levels of the first set of the plurality of cable modems does not exceed a threshold total transmit power level.

12. The computer readable medium of claim 11, wherein the addition of the successive ones of the plurality of cable modems comprises ensuring that the aggregation of the transmit power levels of the first set of the plurality of cable modems does not exceed the threshold total transmit power level for the specified frequency band.

13. The computer readable medium of claim 10, further comprising determining a location of at least two of the cable modems of the plurality of cable modems,
wherein the determination of the first set of the plurality of cable modems that can be allocated to the specified frequency band available for upstream communications is performed according to the aggregation of the transmit power levels of the first set of the plurality of cable modems and a separation of the at least two cable modems.

14. The computer readable medium of claim 10, further comprising:
recording an identification of each cable modem of the first set;
recording a location of each cable modem of the first set;
receiving information about a leak of a signal in the specified frequency band; and
dispatching a technician using the locations of the cable modems of the first set.

15. A non-transitory computer readable medium comprising computer executable instructions which when executed by a computer cause the computer to perform a method of provisioning a plurality of cable modems connected to a node, the method comprising:
obtaining an identification of a specified frequency band susceptible to radio frequency interference;
receiving a request from a first cable modem of the plurality of cable modems for provisioning;
determining that capacity is available outside of the specified frequency band;
directing the first cable modem to transmit in a band outside of the specified frequency band;
receiving a request from a second cable modem of the plurality of cable modems for provisioning;
determining that capacity is not available outside of a specified frequency band;
determining that a transmit power level of the second cable modem is below a threshold for the specified frequency band; and
reducing radio frequency interference of the specified frequency band by directing the second cable modem to transmit in at least a portion of the specified frequency band.

16. The computer readable medium of claim 15, further comprising:
receiving a request from a third cable modem of the plurality of cable modems for provisioning;
determining that capacity is not available outside of a specified frequency band;
determining that a transmit power level of the third cable modem is above a threshold for the specified frequency band;
determining that a fourth cable modem has a transmit power level below the threshold and is operating outside of the specified frequency band;
directing the fourth cable modem to move into at least a portion of the specified frequency band; and
directing the third cable modem to transmit outside of the specified frequency band.

17. The computer readable medium of claim 15, further comprising:
receiving a request from a fifth cable modem of the plurality of cable modems for provisioning;
determining that capacity is not available outside of a specified frequency band;
determining that a transmit power level of the fifth cable modem is above a threshold for the specified frequency band;
determining that no other cable modem of the plurality of cable modems has a transmit power level below the threshold and is operating outside of the specified frequency band;
moving a sixth cable modem having a lowest transmit power level among a set of cable modems operating outside of the specified frequency band into the specified frequency band; and directing the fifth cable modem to transmit outside of the specified frequency band.

18. The computer readable medium of claim 15, further comprising:
recording an identification of the second cable modem;
recording a location of the second cable modem;
receiving information about a leak of a signal in the specified frequency band; and
dispatching a technician using the location of the second cable modem.

19. A system comprising:
a node comprising a processor and a memory;
a plurality of terminus devices; and
a network connecting the node and the plurality of terminus devices, wherein the network comprises a coaxial cable portion configured to carry signals in a radio spectrum,
wherein the node is configured to allocate a portion of the radio spectrum to each terminus device of the plurality of terminus devices, to set a signal transmit power for each terminus device of the plurality of terminus devices, and reduce radio frequency interference of a specified frequency band by limiting an aggregate signal transmit power of a set of the terminus devices allocated to transmit signals in the specified frequency band of the radio spectrum based on the specified frequency band being susceptible to radio frequency interference.

20. The system of claim 19, wherein the signal transmit power set by the node is sufficient to communicate a reliable signal from a respective terminus device of the plurality of terminus devices to the node.

21. The system of claim 19, wherein the node is configured to determine a geo-location of each terminus device of the plurality of terminus devices, wherein the limitation of the aggregate signal transmit power has a geographic component dispersing the allocated portion of the radio spectrum in the specified frequency band over a geographic area defined by the plurality of terminus devices.

* * * * *